US010984999B2

(12) United States Patent
Hsieh et al.

(10) Patent No.: US 10,984,999 B2
(45) Date of Patent: Apr. 20, 2021

(54) DEVICE FOR DETECTING CHARGED PARTICLES AND AN APPARATUS FOR MASS SPECTROMETRY INCORPORATING THE SAME

(71) Applicant: ACROMASS TECHNOLOGIES, INC., Taipei (TW)

(72) Inventors: Hung-Liang Hsieh, Taipei (TW); Chun-Yen Cheng, Qionglin Township, Hsinchu County (TW); Yi-Kun Lee, Hsinchu (TW); Chih-Hsiang Yang, Hukou Township, Hsinchu County (TW); Liang-Chun Fan, Taoyuan (TW); Yao-Hsin Tseng, Taipei (TW); Szu-Wei Chou, Hualien (TW)

(73) Assignee: ACROMASS TECHNOLOGIES, INC, Taipei (TW)

( * ) Notice: Subject to any disclaimer, the term of this patent is extended or adjusted under 35 U.S.C. 154(b) by 190 days.

(21) Appl. No.: 16/086,266

(22) PCT Filed: May 9, 2017

(86) PCT No.: PCT/US2017/031785
§ 371 (c)(1),
(2) Date: Sep. 18, 2018

(87) PCT Pub. No.: WO2017/196863
PCT Pub. Date: Nov. 16, 2017

(65) Prior Publication Data
US 2020/0020515 A1 Jan. 16, 2020

Related U.S. Application Data

(60) Provisional application No. 62/334,126, filed on May 10, 2016.

(51) Int. Cl.
*H01J 49/02* (2006.01)
*H01J 49/42* (2006.01)

(52) U.S. Cl.
CPC .......... *H01J 49/025* (2013.01); *H01J 49/027* (2013.01); *H01J 49/4225* (2013.01)

(58) Field of Classification Search
CPC ...... H01J 49/025; H01J 49/4225; H01J 49/02; H01J 49/027; H01J 37/244; H01J 2237/24405
See application file for complete search history.

(56) References Cited

U.S. PATENT DOCUMENTS 6,180,942 B1 1/2001 Tracy et al.
7,928,382 B2 * 4/2011 Hatakeyama ......... H01J 37/261
250/310

(Continued)

OTHER PUBLICATIONS

International Search Report issued in PCT/US2017/031785, dated Jul. 19, 2017 (2 pages).

*Primary Examiner* — Wyatt A Stoffa
(74) *Attorney, Agent, or Firm* — Hamre, Schumann, Mueller & Larson, P.C.

(57) ABSTRACT

A device for detecting charged particles includes a substrate, a charge detection plate and an integrated circuit unit that are electrically connected together and respectively disposed on non-coplanar first and second sides of the substrate, and an interference shielding unit substantially enclosing the charge detection plate and the integrated circuit unit in such a manner as to permit impingement on the charge detection plate by the charged particles from outside of the interference shielding unit. The integrated circuit unit disposed on the second side is non-coplanar with the charge detection plate disposed on the first side so as to prevent interference on the integrated circuit unit by the charged particles.

18 Claims, 12 Drawing Sheets

(56) References Cited

U.S. PATENT DOCUMENTS

| | | | |
|---|---|---|---|
| 9,324,546 B2* | 4/2016 | Fitzgerald | G01N 27/622 |
| 2008/0087846 A1* | 4/2008 | Lee | H01J 37/244 |
| | | | 250/492.21 |
| 2009/0146890 A1 | 6/2009 | Gabara | |
| 2009/0189069 A1* | 7/2009 | Chen | H01J 49/0077 |
| | | | 250/282 |
| 2011/0095178 A1* | 4/2011 | Giannakopulos | H01J 37/244 |
| | | | 250/282 |
| 2011/0174777 A1 | 7/2011 | Jensen et al. | |
| 2012/0305760 A1* | 12/2012 | Blick | H01J 49/025 |
| | | | 250/282 |
| 2015/0137307 A1 | 5/2015 | Stuber | |
| 2015/0300966 A1 | 10/2015 | Kessler | |
| 2019/0228960 A1* | 7/2019 | Cheng | H01J 49/424 |

* cited by examiner

DEVICE FOR DETECTING CHARGED PARTICLES AND AN APPARATUS FOR MASS SPECTROMETRY INCORPORATING THE SAME

CROSS-REFERENCE TO RELATED APPLICATION

This application claims priority of U.S. Provisional Patent Application No. 62/334,126, filed on May 10, 2016.

FIELD

This invention relates to a device for sensing and detecting charged particles, and a mass spectrometer incorporating the same.

BACKGROUND

Charged particle detectors are used in many applications requiring, for example, ion or electron detection. One such application is mass spectrometry. Mass spectrometers are widely used to separate and analyze charged particles on the basis of their mass to charge ratio (m/z) and many different types of mass spectrometers and charged particle detectors are known.

A first conventional charged particle detector for mass spectrometry comprises an electron multiplier, such as discrete or continuous dynode electron multiplier (e.g., microchannel plate (MCP)), which makes use of the physical phenomenon called "secondary emission" for charge amplification, usually in the scale of $10^6$. However, since secondary emission is a strong function of velocity of incoming charged particles, the first conventional charged particle detector is unsuitable for performing mass spectrometry of a mixture of large biomolecules, which are usually too slow for creating secondary emission.

A second conventional charged particle detector, termed ion collector, such as Faraday cup, has been used with mass spectrometers for charge detection of large DNA fragments or whole viruses. However, the large amount of electronics noise associated with the second conventional charged particle detector renders it impractical for direct charge measurements of cells or microparticles.

A third conventional charged particle detector, like the one described in U.S. Pat. No. 8,963,075, is based on the principle of electromagnetic field induction. While the third conventional charged particle detector is suitable for performing mass spectrometry of highly charged large particles, such as DNA fragments or viruses with for example ten thousand charges per particle, when the incoming charged particles are composed of a great number of small charged particles (ion cloud), the third conventional charged particle detector fails to generate an accurate detection result since the resultant readout would have an undesirable damping/tailing effect.

SUMMARY

Therefore, the object of the present invention is to provide a device for detecting charged particles that can improve upon at least one of the aforesaid drawbacks of the prior art.

According to one aspect of this invention, a device for detecting charged particles includes a substrate, a charge detection plate, an integrated circuit unit and an interference shielding unit. The charge detection plate is disposed on a first side of the substrate. The integrated circuit unit is electrically connected to the charge detection plate, and is disposed on a second side of the substrate that is non-coplanar with the first side. The interference shielding unit substantially encloses the charge detection plate and the integrated circuit unit in such a manner as to permit impingement on the charge detection plate by the charged particles from outside of the interference shielding unit. The integrated circuit unit disposed on the second side is non-coplanar with the charge detection plate disposed on the first side so as to prevent interference on the integrated circuit unit by the charged particles.

According to another aspect of this invention, there is provided an apparatus for mass spectrometry that includes a mass analyzer for receiving ions from an ion source and outputting selected ions, and the aforesaid device for receiving the selected ions as the charged particles.

BRIEF DESCRIPTION OF THE DRAWINGS

Other features and advantages of this disclosure will become apparent in the following detailed description of the embodiments with reference to the accompanying drawings, of which.

DETAILED DESCRIPTION

Figure 1A:
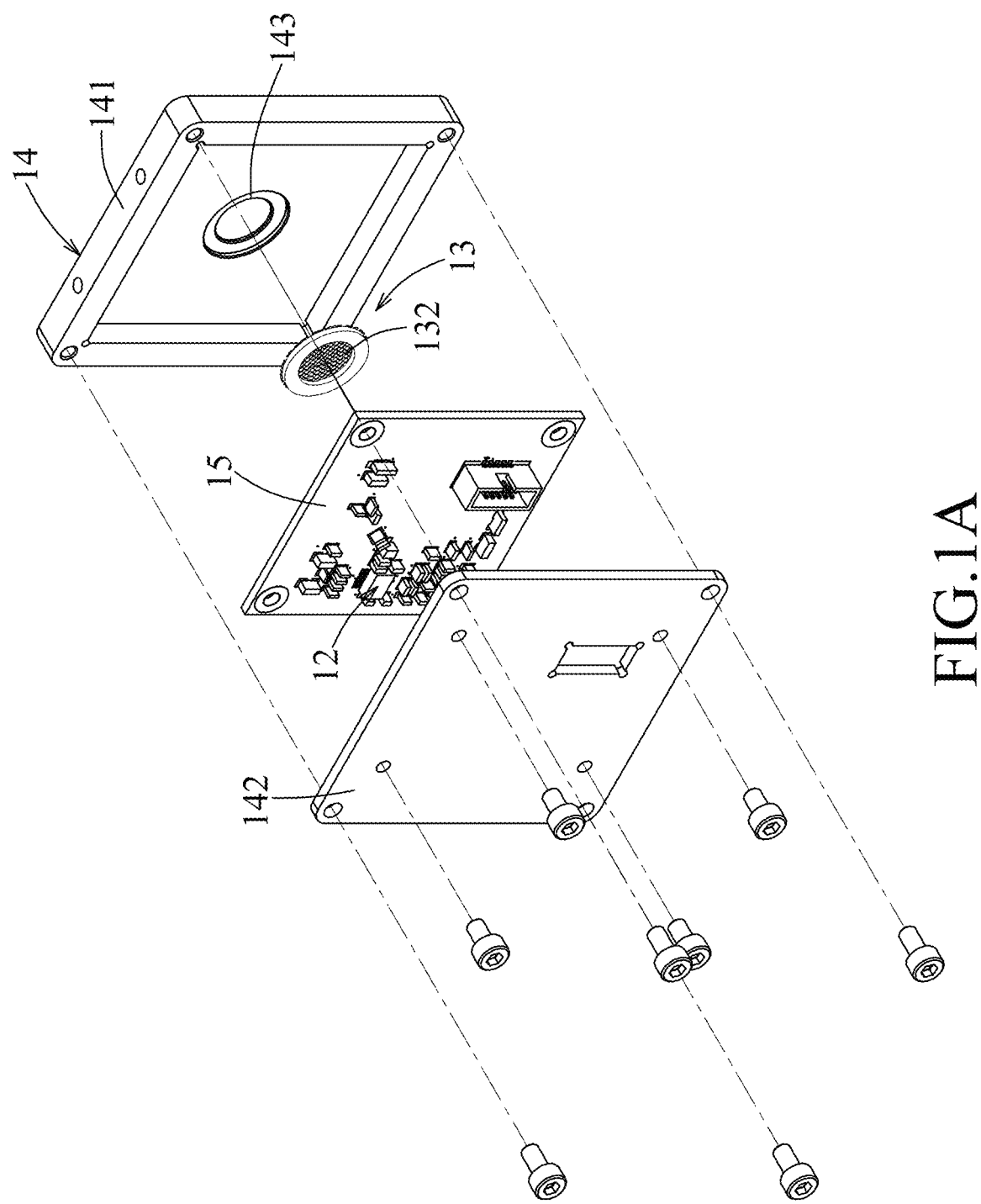
FIG. 1A is a schematic exploded perspective view of an embodiment of a device for detecting charged particles according to this disclosure.
Figure 1B:
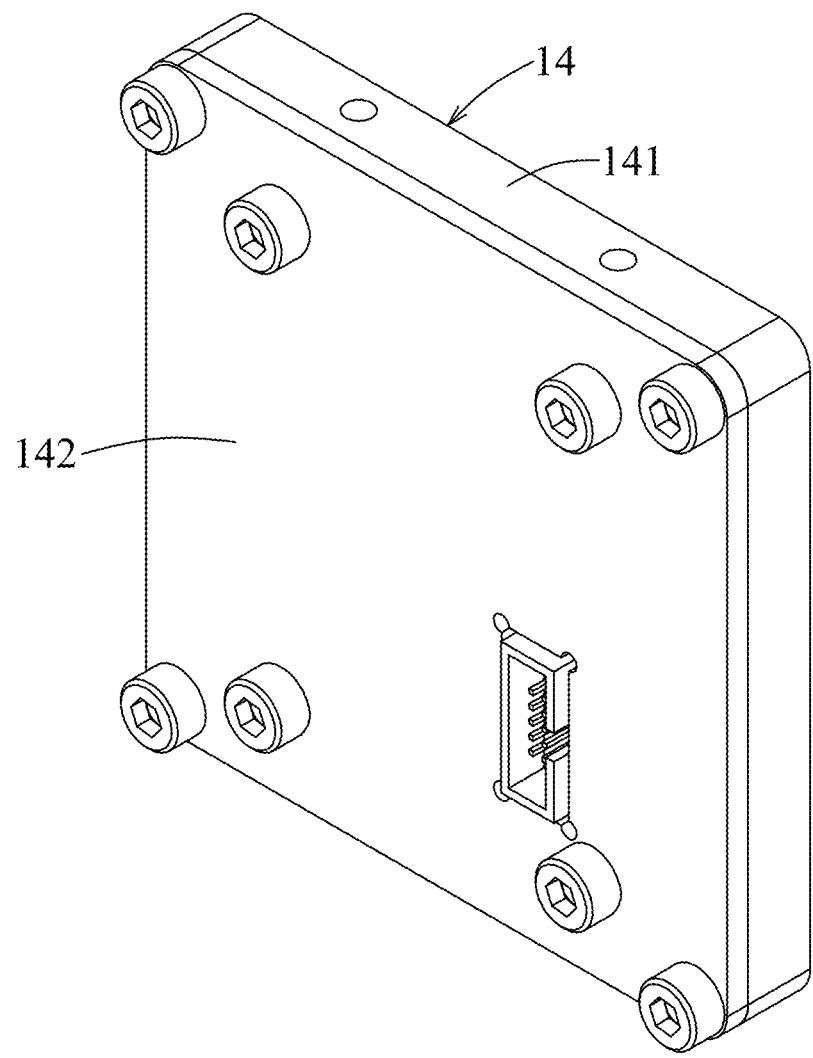
FIG. 1B is a schematic assembled perspective view of the embodiment of the device as depicted in FIG. 1A.

As described herein, "charged particle" refers to a particle with an electric charge. It may be an ion, such as a molecule or atom with a surplus or deficit of electrons relative to protons. It can be the electrons and protons themselves, as well as other elementary particles, like positrons.

Before the disclosure is described in greater detail, it should be noted that where considered appropriate, reference numerals or terminal portions of reference numerals have been repeated among the figures to indicate corresponding or analogous elements, which may optionally have similar characteristics.

As described herein, "RC circuit" or "RC network" refers to a resistor-capacitor circuit or network, and "CR circuit" or "CR network" likewise refers to a capacitor-resistor circuit or network. It is an electric circuit composed of resistors and capacitors driven by a voltage or current source.

With reference to FIGS. 1A, 1B, 2A, 3 and 4, an embodiment of a device 1 for detecting charged particles according to this disclosure includes a substrate 10, a charge detection plate 11 that is disposed on a first side 101 of the substrate 10 to face incoming charged particles (not depicted), an integrated circuit unit 12 that is electrically connected to the charge detection plate 11 and that is disposed on a second side 102 of the substrate 10, where the second side 102 is non-coplanar with the first side 101, and an interference shielding unit 13 that is installed to substantially enclose the charge detection plate 10 and the integrated circuit unit 11 in such a manner as to permit impingement on the charge detection plate 11 by charged particles from outside of the interference shielding unit 13 and to permit signal output by the integrated circuit unit 12.

The integrated circuit unit 12, being disposed on the second side 102 of the substrate 10, is therefore non-coplanar with the charge detection plate 11, which is disposed on the first side 101 of the substrate 10, so as to prevent interference (e.g., electromagnetic interference) on the integrated circuit unit 12 by the incoming charged particles.

In certain embodiments, the charge detection plate 11 is made of a conducting material, such as metal. In one embodiment, the charge detection plate 12 is a copper plate, which serves as an image charge/current conducting plate to directly sense approaching charged particles such as ions.

Figure 2A:
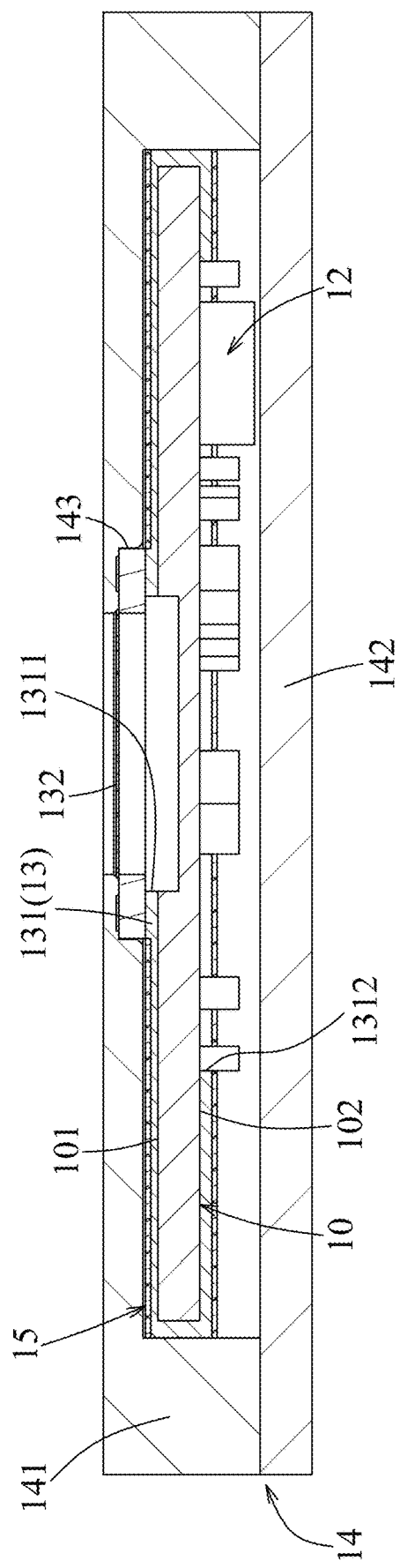
FIG. 2A is a schematic sectional view of the embodiment of the device as depicted in FIG. 1A.

In one embodiment, the first and second sides 101, 102 of the substrate 10 are opposite to each other. For example, the first and second sides 101, 102 may respectively be the top and bottom sides of the substrate 10 in the orientation of the device 1 as depicted in FIG. 2A. It should be noted that the directional terms such as "top" and "bottom" as used throughout this disclosure are not given absolute directional meanings, and are merely used in a general sense when referring to any specific drawing for ease of explanation. In such a configuration, the integrated circuit unit 12, being disposed on the second side 102 of the substrate 10, is therefore opposite to the charge detection plate 11, which is disposed on the first side 101 of the substrate 10, so as to prevent interference (e.g., electromagnetic interference) on the integrated circuit unit 12 by the incoming charged particles.

Generally speaking, the interference shielding unit 13 is an isolating metallic enclosure that serves to block outside electromagnetic fields, and protect internal components of the device 1 against electromagnetic interference, such as radio frequency (RF) interference.

In one embodiment, the interference shield unit 13 includes a Faraday cage 131 and a mesh 132 that is connected to the Faraday cage 131. As depicted in FIG. 2A, the Faraday cage 131 is configured to substantially cover the first and second sides 101, 102 of the substrate 10, and has two openings 1311, 1312 that respectively correspond in position to the charge detection plate 11 and the integrated circuit unit 12 to respectively expose the charge detection plate 11 and the integrated circuit unit 12. The mesh 132 covers the opening 1311 of the Faraday cage 131 that corresponds in position to the charge detection plate 11 and is configured to permit impingement on the charge detection plate 11 by the charged particles from outside of the interference shielding unit 13. In one implementation, the Faraday cage 131 is made of a solid metal material. However, in other embodiments of this disclosure, the Faraday cage 131 may also have a mesh structure.

The interference shielding unit 13 including the Faraday cage 131 and the mesh 132 is used to enclose the substrate 10, the charge detection plate 11 and the integrated circuit unit 12 to block undesired (unwanted) external electromagnetic interference, so as to enhance the detection sensitivity with respect to charged particles of the device 1.

According to one embodiment of this disclosure, the interference shielding unit 13 further includes a conductive sheet 133 (see FIG. 2B) that is connected to the Faraday cage 131, and that covers the opening 1312 of the Faraday cage 131 corresponding in position to the integrated circuit unit 12. The conductive sheet 133 may for example be implemented by a copper tape.

In one embodiment of this disclosure, the device 1 further includes a conductive outer housing 14 that substantially encloses the substrate 10, the charge detection plate 11, and the Faraday cage 131 in such a manner as to permit impingement on the charge detection plate 11 by the charged particles from outside of the interference shielding unit 13 and to permit signal output by the integrated circuit unit 12.

In one embodiment, as depicted in FIG. 1A, the conductive outer housing 14 may be composed of a retaining member 141 and a cover member 142 that are interconnected, for example by screw fasteners. The retaining member 141 defines a retaining space for retaining the substrate 10, the charge detection plate 11, the integrated circuit unit 12, and the Faraday cage 131.

The conductive outer housing 14 has a hole 143 that corresponds in position to the charge detection plate 11, and the mesh 132 is mounted to the conductive outer housing 14 to cover the hole 143. In the exemplary embodiment depicted in FIG. 1A, the hole 143 is formed in the retaining member 141.

In some embodiments of this disclosure, a portion of the conductive outer housing 14 that corresponds in position to the integrated circuit unit 12 may be connected to the Faraday cage 131 and serve as part of the interference shielding unit 13 in place of the conductive sheet 133 mentioned above. The cover member 142 in FIGS. 1A, 1B and 2A may serve as an example of such a portion of the conductive outer housing 14 serving as part of the interference shielding unit 13. Note that in this embodiment, the cover member 142 is conductively connected to the Faraday cage 131 by being connected to the retaining member 141 mounted with the mesh 132, which is in turn disposed in contact with the Faraday cage 131.

With the provision of the interference shielding unit 13, the coupling of undesired radiated electromagnetic energy in the device 1 is prevented or its effect minimized. The interference shielding unit 13 takes the form of a metallic barrier that is inserted in the path of electromagnetic waves between the source of the radiation and the device 1. In order to prevent the electromagnetic energy from penetrating through the established shield, the outer surface of the interference shielding unit 13 has to be grounded. The design of cable shielding and grounding is important for the reduction of electromagnetic interference.

Figure 2B:
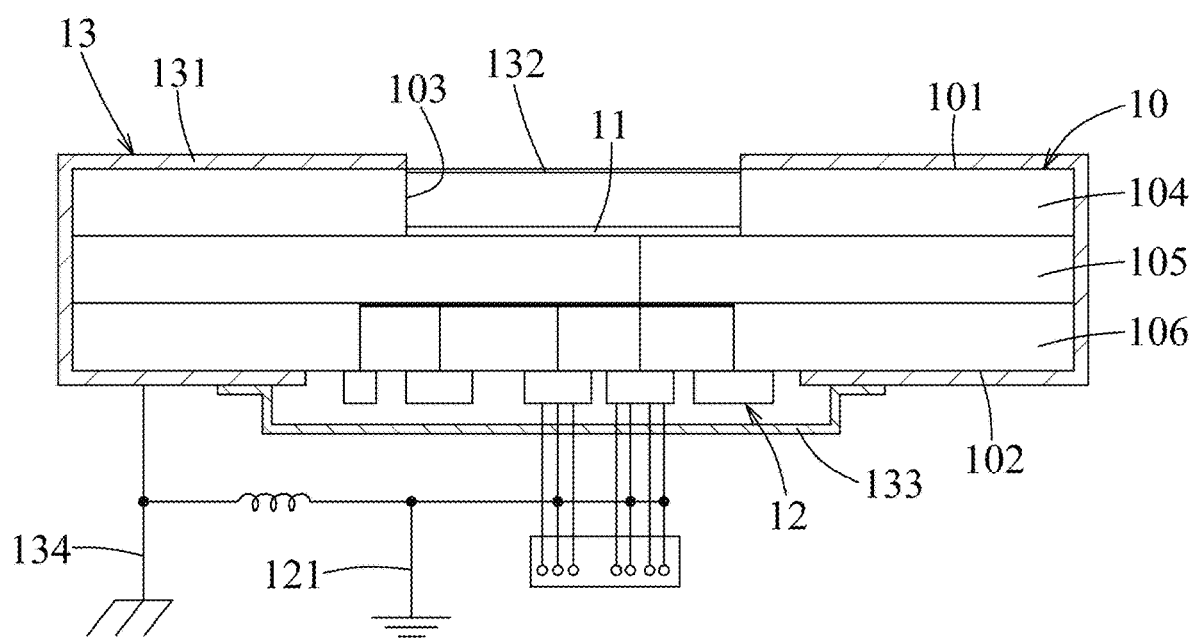
FIG. 2B is a schematic sectional view of an embodiment of the device for detecting charged particles according to the present disclosure.

With the Faraday cage 131, the mesh 132, and the conductive sheet 133 (or the portion of the conductive outer housing 14) being conductively interconnected, the interference shielding unit 13 as a whole is electrically conducted to an isolated grounding path 134 (see FIG. 2B). Such grounding path 134 is isolated from a signal grounding path 121 for the integrated circuit unit 12. It should be readily appreciated by one skilled in the art that an equivalent inductor depicted in FIG. 2B to interconnect the grounding paths 134 and 121 is an indication that the two grounding paths 134, 121 are isolated from each other. This advantageously avoids or minimizes the coupling of undesired radiated electromagnetic energy, and therefore sets a higher detection limit for the device 1.

In one embodiment, the substrate 10 may have an indented portion and the charge detection plate 11 is disposed in the indented portion 103. The substrate 10 may have at least one layer. One way of implementing the indented portion 103 is described with particular reference to FIG. 2B, where the substrate 10 has a triple-layer structure with first, second and third layers 104, 105, 106 stacked in the given sequence. The first layer 104 has a portion that uncovers a surface of a portion of the second layer 105, and the charge detection plate 11 is disposed on the surface of the portion of the second layer 105, while the integrated circuit unit 12 is disposed on a surface of the third layer 106 opposite to the second layer 105. In some embodiments, the substrate 10 may be a printed circuit board. Note that for clarity of illustration, sectional lines are omitted for the first to third layers 104-106 of the substrate 10.

From a manufacturing stand-point, in one embodiment, the device 1 of this disclosure may be made of, for example, four printed circuit layers, with a first layer constituting the first side 101, second and third layers composing the substrate 10, and a fourth layer constituting the second side 102. With metal mesh at the top center as ion entrance, one printed copper foil covers the substrate 10 over the top, the sides, and nearly all the bottom.

In practice, the device 1 may further include an insulating layer 15 that covers a majority of the Faraday cage 131, and the mesh 132 is disposed in contact with a portion of the Faraday cage 131 uncovered by the insulating layer 15.

Figure 3:
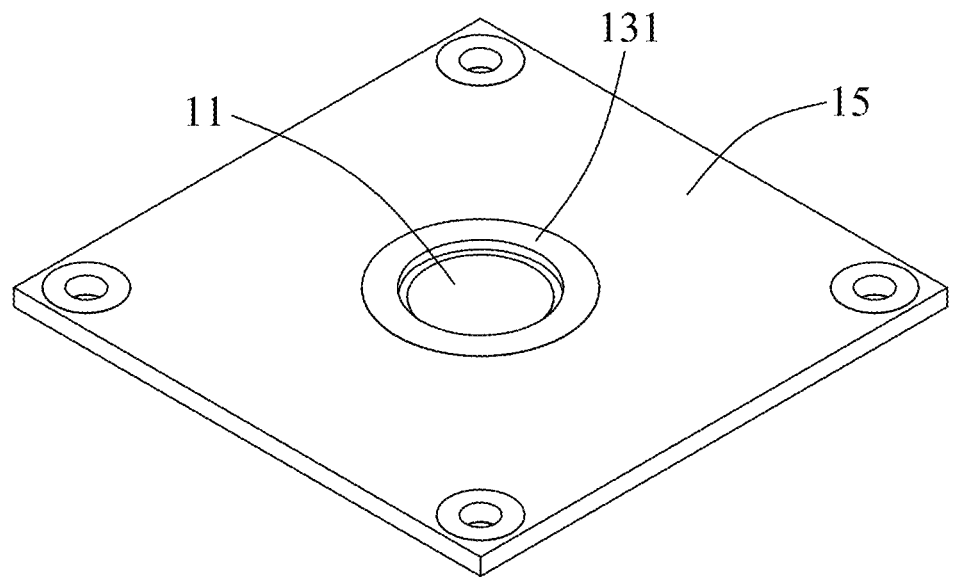
FIG. 3 is a schematic top view of an exemplary assembly of a substrate, a charge detection plate, an integrated circuit unit, a Faraday cage and an insulating layer of an embodiment of the device for detecting charged particles according to this disclosure.
Figure 4:
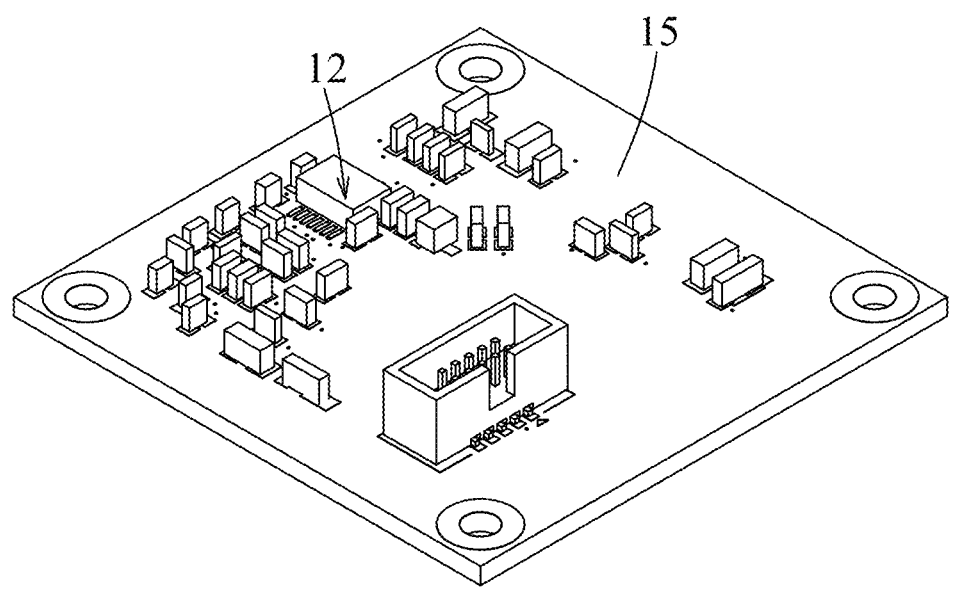
FIG. 4 is a schematic bottom view of the exemplary assembly depicted in FIG. 3.

In one embodiment, the charge detection plate 11 may be in the form of a circle that is approximately 5 to 20 mm in radius, and may be centrally disposed with respect to the substrate 10. Therefore, the opening 1311 of the Faraday cage 131, the mesh 132, and the hole 143 of the conductive outer housing 14, all aligned with the charge detection plate 11, are all centrally positioned with respect to the substrate 10 (or also with respect to the entire device 1 in some embodiments). With such kind of construction, the insulating layer 15 would substantially cover nearly the entirety of the Faraday cage 131, except for a contacting portion of the Faraday cage 131 which is exposed (as depicted in FIG. 3) to be in contact with the mesh 132, once the conductive outer housing 14, mounted with the mesh 132 to cover the hole 143 thereof, is assembled to the rest of the device 1. The contacting portion of the Faraday cage 131 may take the form of a ring having an outer radius slightly greater than the radius of the charge detection plate 11.

Given the above varying structural configurations of the device 1 for detecting charged particles of this disclosure, each detection event may be completed when the charged particles, such as ions, impinge upon the charge detection plate 11, which can directly sense and detect the charged particles with an enhanced detection sensitivity. In addition, the number of charges on the charged particles can be rapidly and directly measured using the device 1 without requiring conventional charge amplification at the detector.

Figure 5:
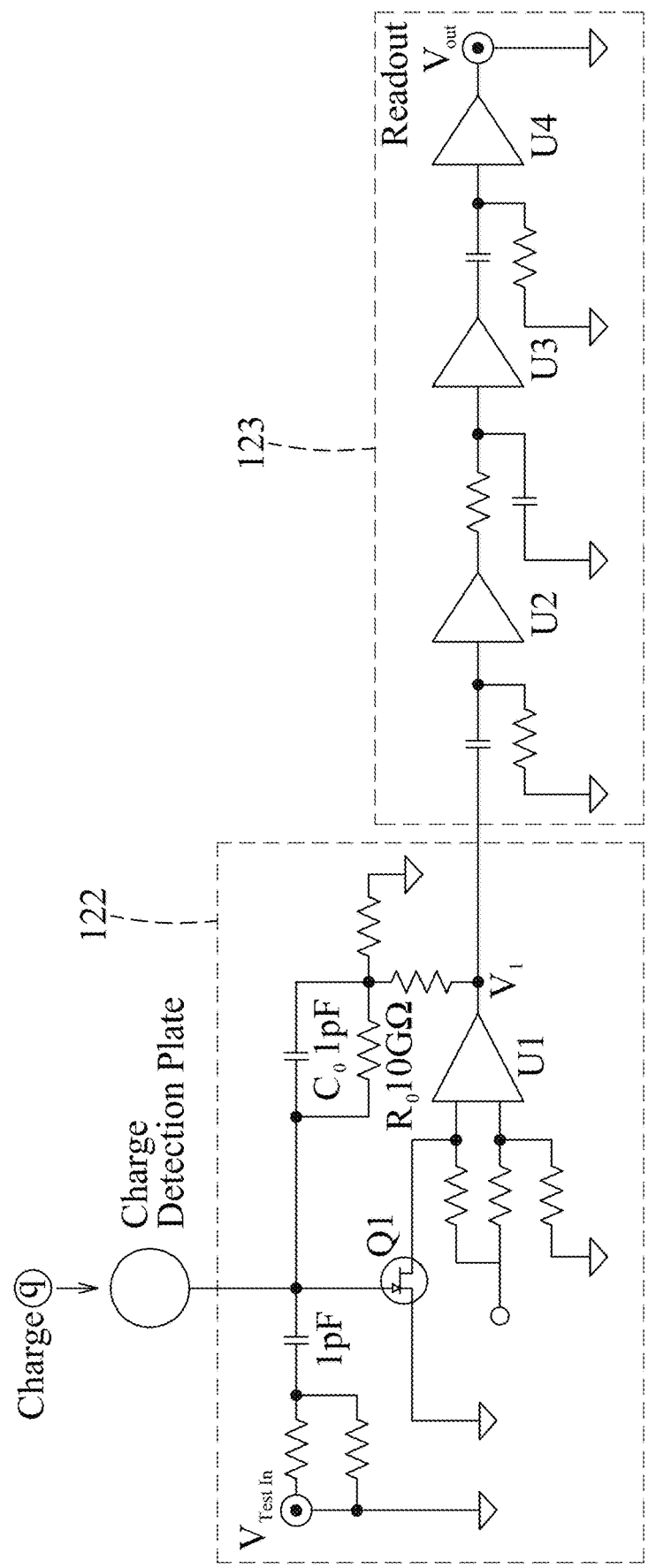
FIG. 5 is a circuit diagram depicting an exemplary implementation of the integrated circuit unit of the device for detecting charged particles according to this disclosure.

FIG. 5 depicts an exemplary embodiment of the integrated circuit unit 12 of the device 1. The integrated circuit unit 12 includes an integrated current-to-voltage conversion circuit 122 that converts the input current to an output voltage representative of that current, and a voltage amplifier, which is exemplified by a CR-RC-CR network 123 herein, serving as a pulse-shaping circuit that converts received pulse with faster edge speed.

The current that is induced or arrives at the charge detection plate 11 is accumulated upon a nominal 1 pico-Farad capacitor (C0), with the voltage across a parallel 10 Giga-Ohm resistor (R0). The converted pulse (V1), out of the first electronics stage (the current-to-voltage conversion circuit 122) is subsequently shaped by the CR-RC-CR network 123 and results in a narrow-width pulse readout.

Figure 6:
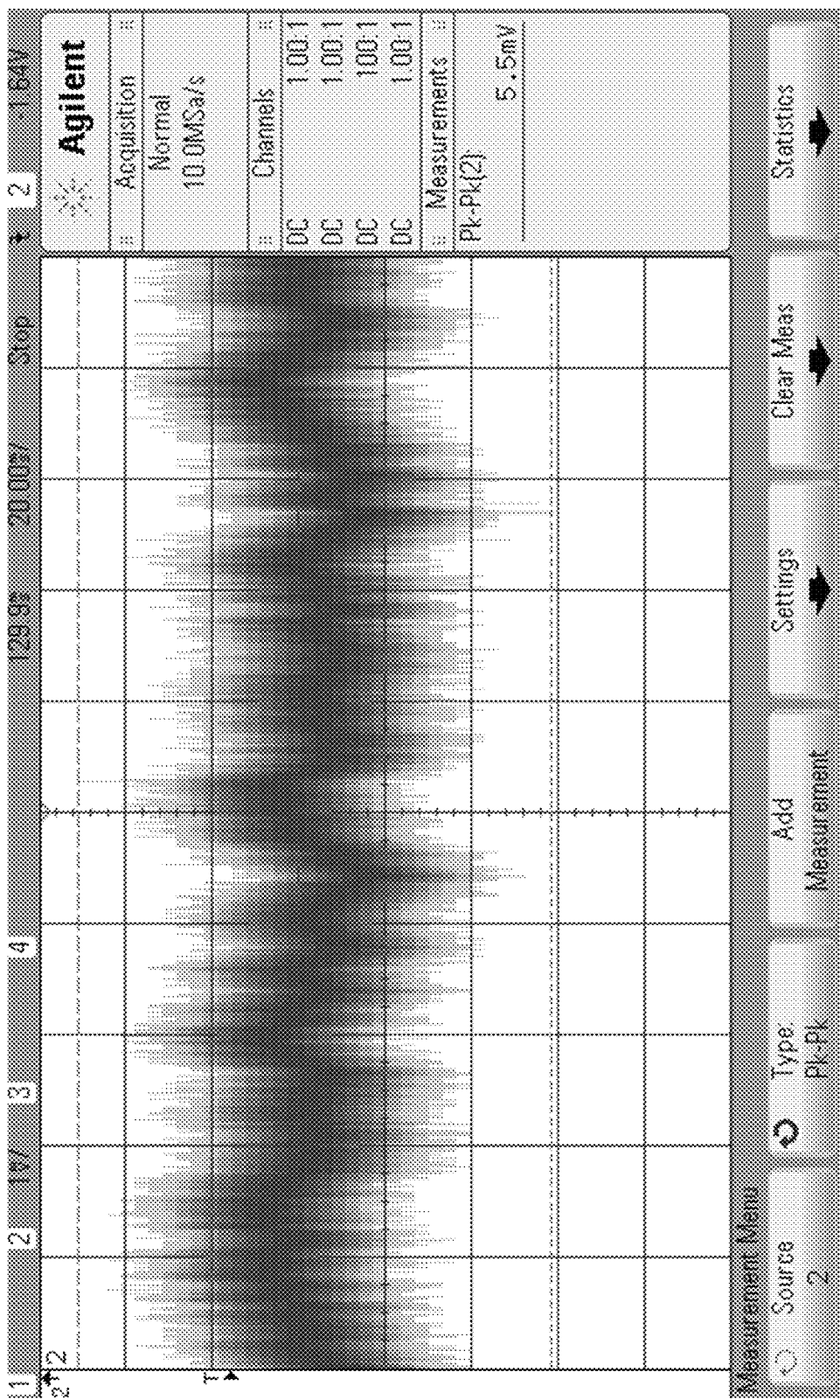
FIG. 6 is a graphical representation illustrating white noise at an output of the integrated circuit unit.

FIG. 6 shows that the detection limit of the integrated circuit unit 12 is set by the Johnson noise from the resistor (R0) and the noise filtering of the CR-RC-CR network 123. The noise floor measures 5.5 mV peak to peak.

In some embodiments, the device 1 of this disclosure can be used for sensing and detecting charged particles in a mass spectrometer or the like. For example, the device 1 may be used in an apparatus for mass spectrometry 2 for directly sensing and detecting charged particles without implementing charge amplification. As an example, the device 1 may be adapted for use in an apparatus for mass spectrometry that further includes a mass analyzer, wherein the charge detection plate 11 is capable of conducting image current of incident charged particles within the range of about 10 to 50 mm away from the charge detection plate 11 (i.e., output of the mass analyzer, which provides the incoming charged particles, may be set up within said range). It should be noted herein that the range of about 10 to 50 mm is provided as an illustrative example only, and this disclosure is not to be limited by the distance between the mass analyzer and the charge detection plate 11, i.e., the mass analyzer may be disposed shorter than 10 mm or greater than 50 mm away from the charge detection plate 11 in some embodiments of this disclosure.

In some embodiments, aside from the device 1, the apparatus for mass spectrometry 2 further includes a mass analyzer 22. The mass analyzer 22 is adapted for receiving ions from an ion source 21, which may be part of the apparatus 2 in some embodiments, and outputs selected ions. For instance, the ion source 21 may ionize an analyte (i.e., material under analysis) (not shown) to create ionized analyte particles, and the mass analyzer 22 outputs selected ions based on a scanning range of m/z ratios to serve as the incident charged particles for the device 1.

In some embodiments, the apparatus for mass spectrometry 2 is a quadrupole ion trap mass spectrometer, where a quadrupole ion trap (QIT) as depicted in FIG. 6 functions as the mass analyzer 22. In some embodiments, the apparatus for mass spectrometry 2 is a linear ion trap mass spectrometer, where the mass analyzer 22 is implemented by a linear ion trap (not shown). In some embodiments, the mass analyzer 22 may be a quadrupole mass analyzer, or a magnetic sector mass analyzer.

Figure 7:
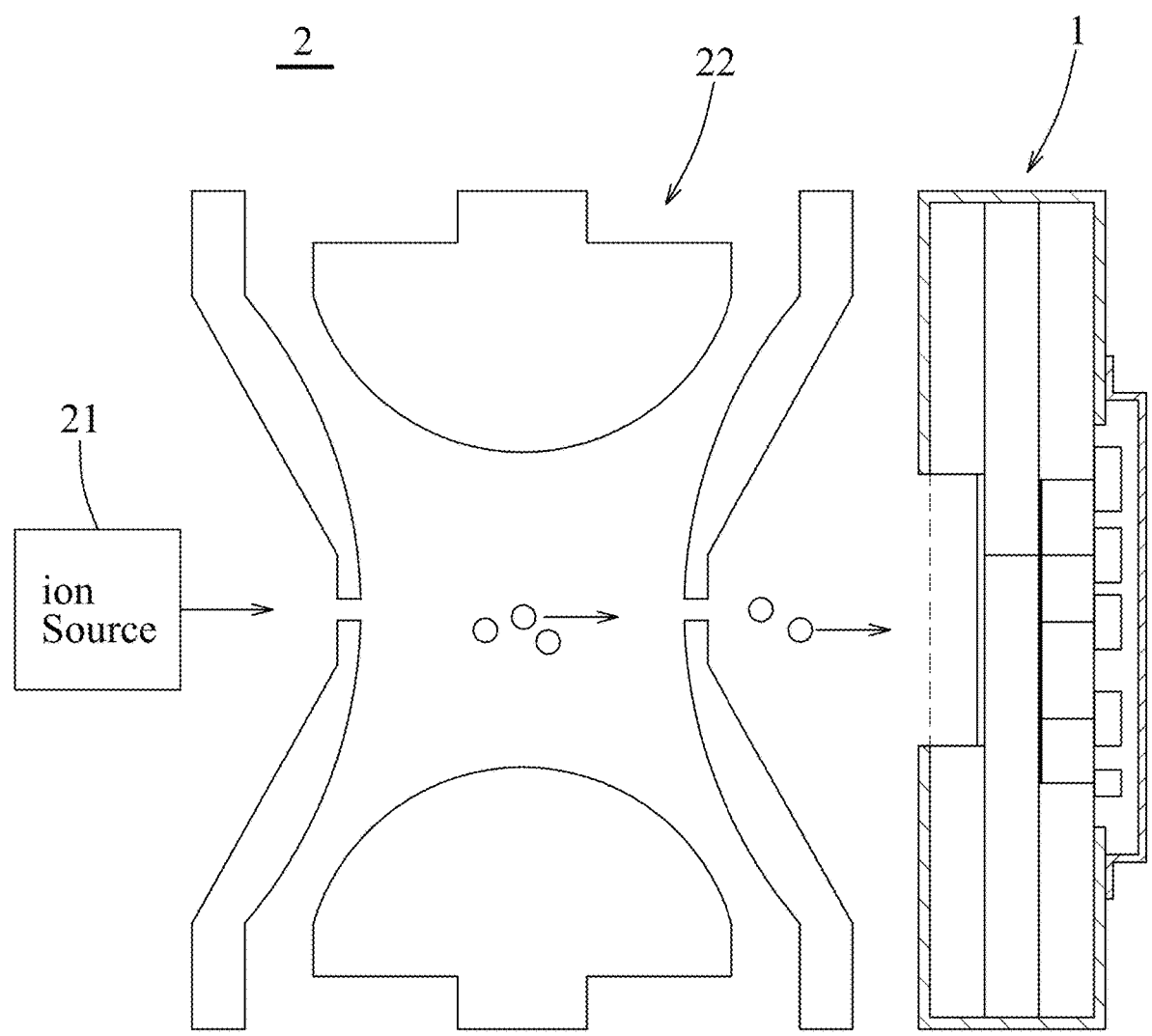
FIG. 7 is a schematic diagram illustrating an embodiment of an apparatus for mass spectrometry that incorporates the device for detecting charged particles in accordance with this disclosure.

A detailed description of the operation of the quadrupole ion trap mass spectrometer depicted in FIG. 7 follows. In the depicted embodiment, the device 1 for detecting charged particles is coupled to the quadrupole ion trap 22 to detect the total number of charges on the charged particles ejected from the quadrupole ion trap 22.

Molecular ions are first introduced into the quadrupole ion trap 22, and kept well inside. Next, the ions are scanned out of quadrupole ion trap 22, according to their mass-to-charge ratios, and directly go to the device 1 for detecting charged particles of this disclosure. Whenever ions come nearby the mesh 132 of the device 1, the charge detection plate 11 immediately conducts the image current of the ions. Each detection event is completed when the ion finally impinges upon the charge detection plate 1, so as to annihilate its image charge. The total number of charges (z) on the analyte may be detected by the device 1.

The device 1 for detecting charged particles, and the apparatus 2 for mass spectrometry incorporating the device 1 may be useful for detecting both small charged particles, and large charged particles, such as biomolecules like proteins, antibodies, protein complexes, protein conjugates, nucleic acids, oligonucleotides, DNA, RNA, polysaccharides and many others, as long as the total number of charges in the incoming particles exceeds approximately 200. The device 1 and the apparatus 2 of this disclosure are thus useful in characterizing molecular weight, products of protein digestion, proteomic analysis, metabolomics, and peptide sequencing, among other things with high detection efficiency and resolution.

In some embodiments, the device 1 for detecting charged particles, and the apparatus 2 for mass spectrometry incorporating the device 1 may be used for the study of proteins, organelles, and cells to characterize molecular weight, products of protein digestion, proteomic analysis, metabolomics, and peptide sequencing, among other things.

The mass spectra obtained using the apparatus 2 of this disclosure may be those of nanoparticles, viruses, or other biological components and organelles having sizes up to about 50 nanometers or greater.

In some variations, the mass spectra obtained using the apparatus 2 of this disclosure may be those of small molecule ions.

The apparatus for mass spectrometry may further include at least one frequency scanning subsystem, and optionally at least one vacuum pump.

Figure 8:
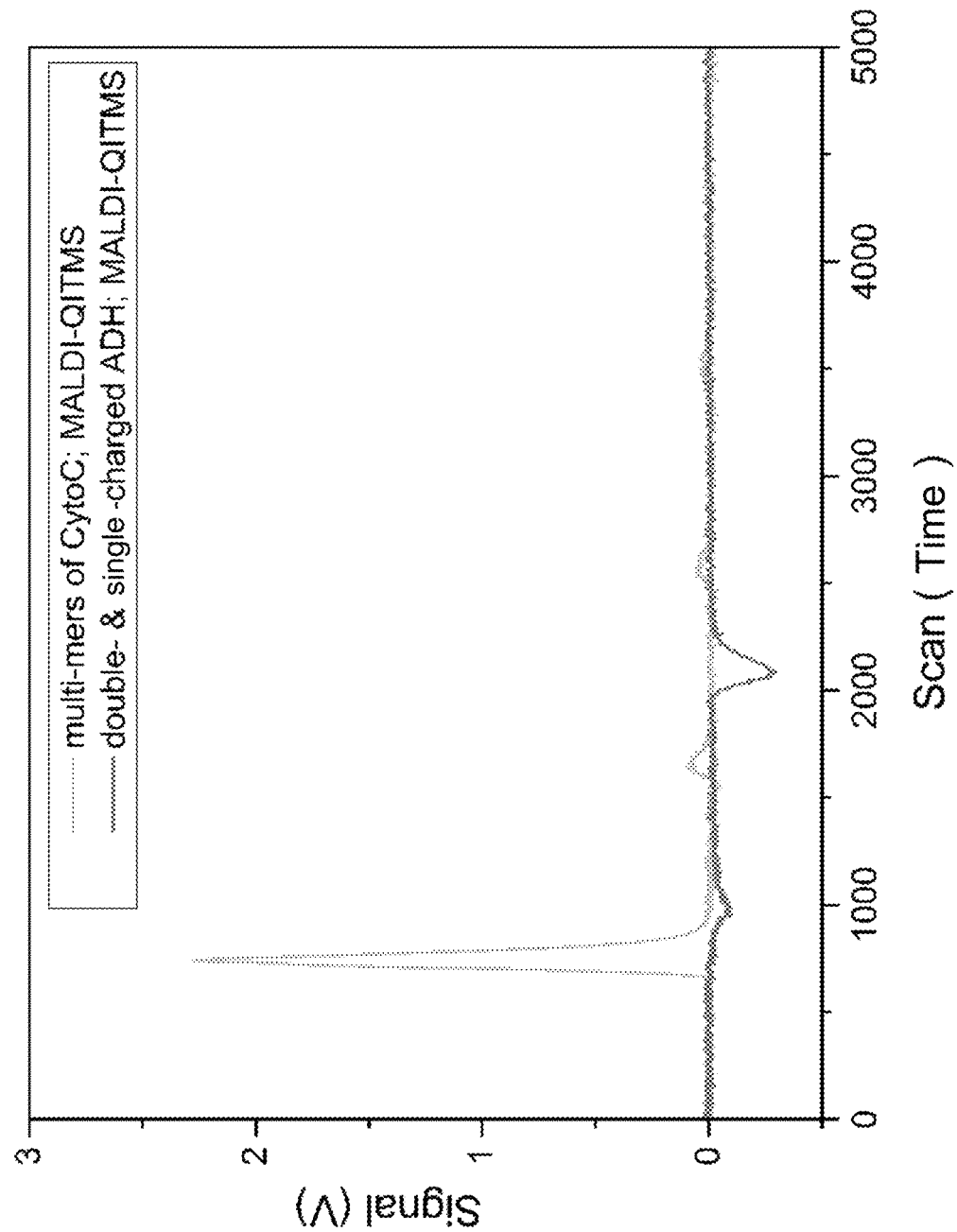
FIG. 8 is a graphical representation of exemplary mass spectra of ADH and CytoC obtained using an embodiment of the apparatus for mass spectrometry according to this disclosure.

FIG. 8 shows the mass spectra of alcohol dehydrogenase (ADH) (monomer) (M.W. (molecular weight) ~46 kDa, single- and double-charged) and multimers (e.g., dimer, trimer and tetramer) of cytochrome C (CytoC) (monomer) (M.W. ~12.5 kDa) obtained by using a three-dimensional (3D) quadrupole ion trap mass spectrometer including the device 1 of this disclosure, where ADH and CytoC have opposite charges. It is evident that the device 1 for detecting charged particles of this disclosure can detect ions in the mass range of 10 kDa, and can discriminate ions of both positive and negative charges. Thus, the apparatus for mass spectrometry that incorporates the device 1 for detecting charged particles of this disclosure is suitable is applicable for use in obtaining the mass spectra of large biomolecules.

Figure 9:
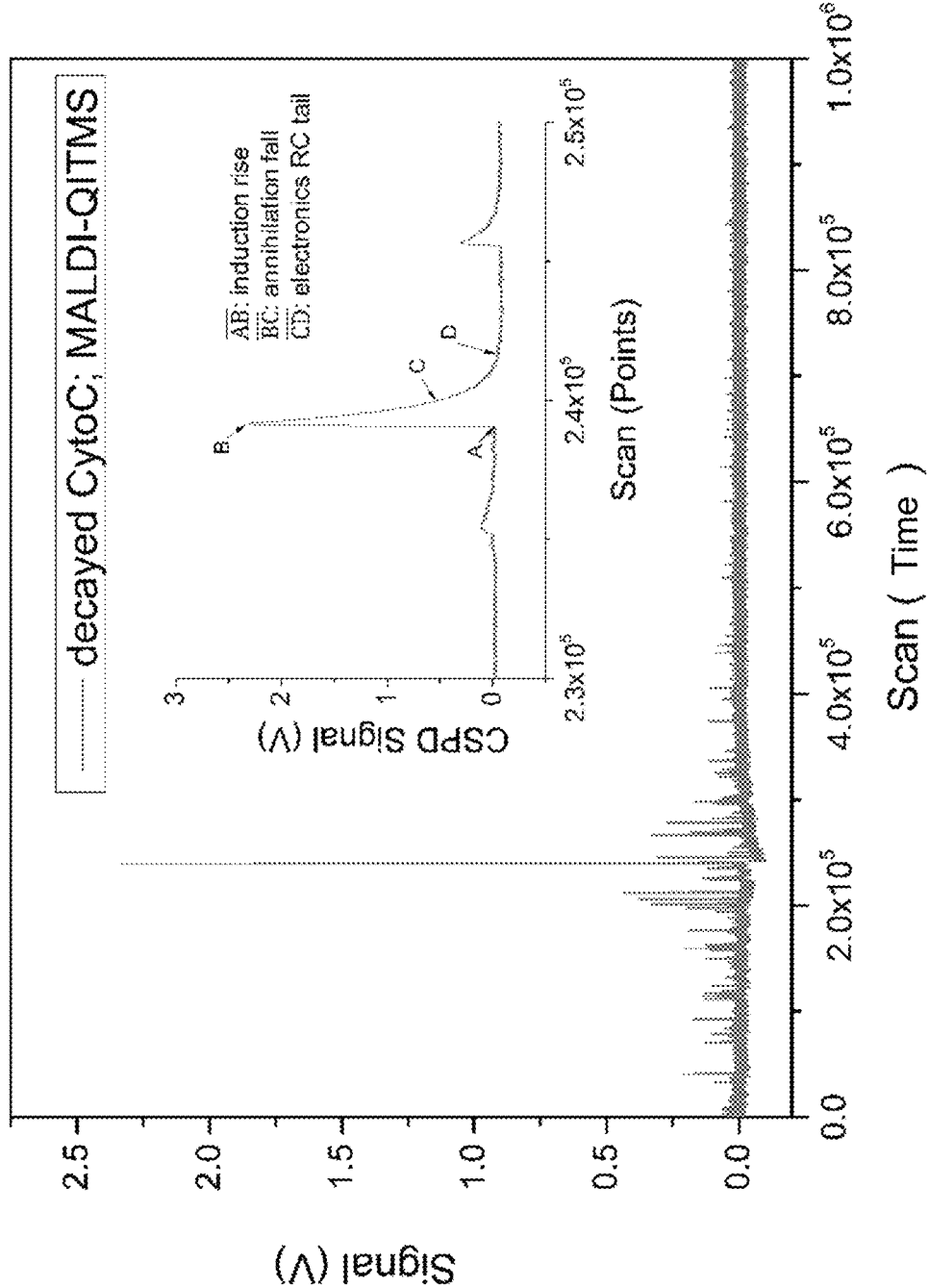
FIG. 9 is a graphical representation of an exemplary mass spectrum of decayed CytoC molecules obtained using an embodiment of the apparatus for mass spectrometry according to this disclosure.

According to an experiment conducted using a three-dimensional (3D) quadrupole ion trap mass spectrometer with the device 1 for detecting charged particles of this disclosure, the result of which is shown in FIG. 9, for decayed CytoC, each scattered detected peak of the mass spectrum has a similar characteristic profile: one fast induction rise (AB), one fast annihilation fall (BC), and one residual RC-tail (CD). Thus, the device 1 for detecting charged particles of this disclosure can discriminate characteristic profile of ion detection from background noise.

Figure 10:
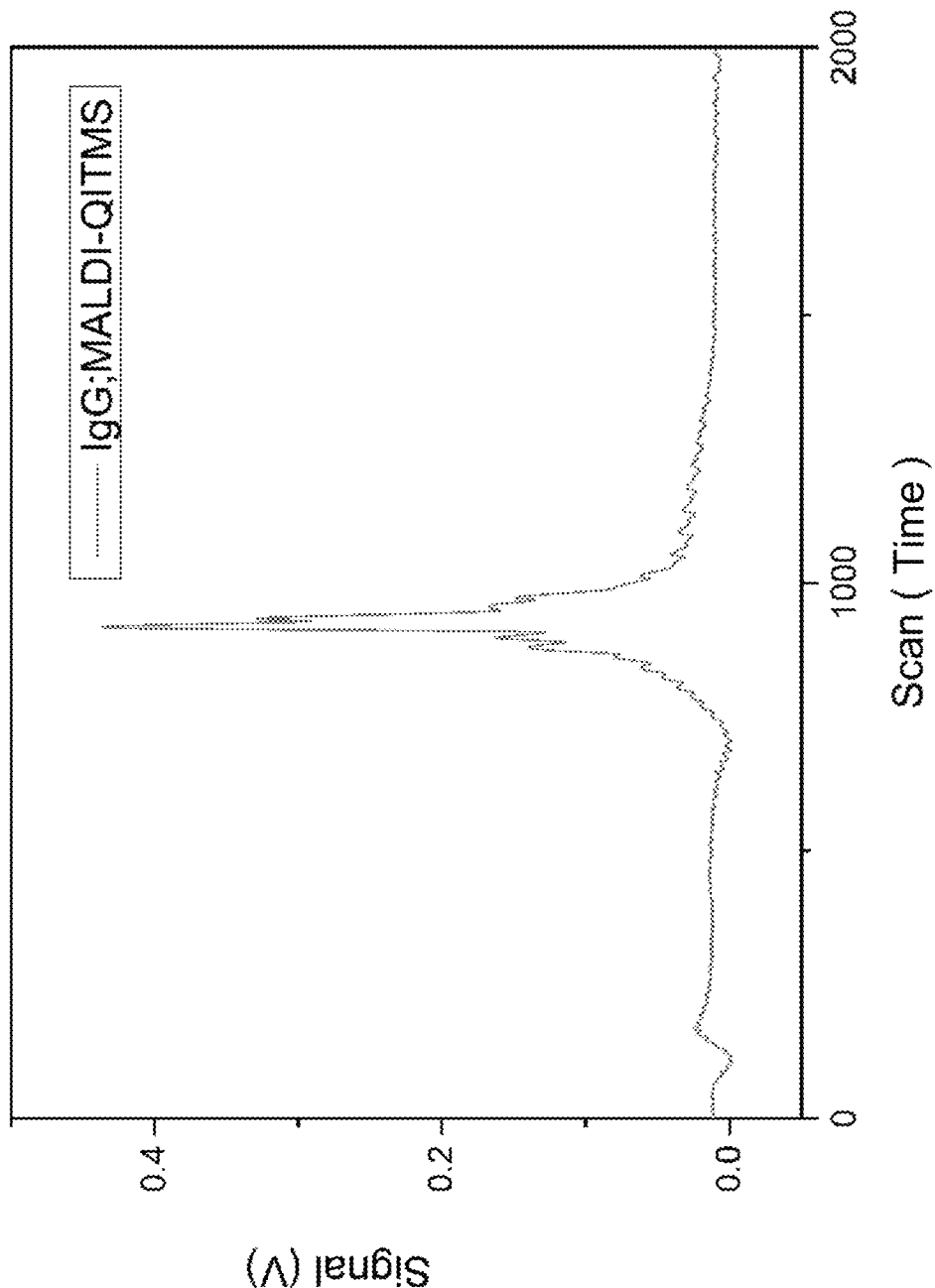
FIG. 10 is a graphical representation of an exemplary mass spectrum of an IgG obtained using an embodiment of the apparatus for mass spectrometry according to this disclosure.
Figure 11:
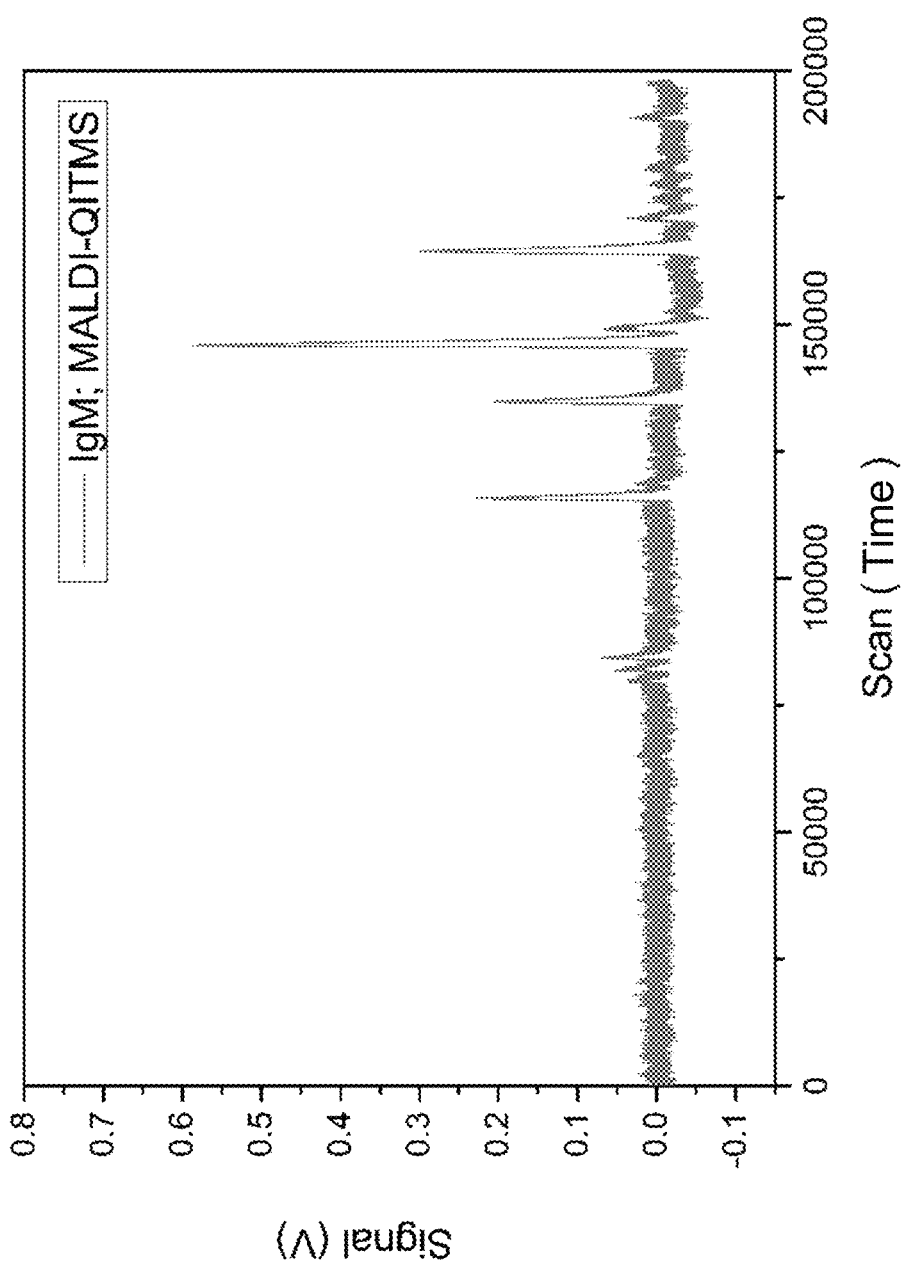
FIG. 11 is a graphical representation of an exemplary mass spectrum of an IgM obtained using an embodiment of the apparatus for mass spectrometry according to this disclosure.

FIGS. 10 and 11 respectively show the mass spectrum of IgG (M.W. ~146 kDa) and IgM (M.W. ~1 MDa, in multimers) obtained using a three-dimensional (3D) quadrupole ion trap mass spectrometer with the device 1 of this disclosure. It is evident that the device 1 of this disclosure can detect ions in the mass ranges of 100 kDa and 1 MDa. Therefore, the apparatus for mass spectrometry that incorporates the device 1 for detecting charged particles of this disclosure is suitable for obtaining the mass spectra of very large biomolecules.

The present invention is not limited to the embodiments disclosed herein. Unless defined otherwise, all technical and scientific terms used herein have the same meanings as commonly understood by one of ordinary skill in the art to which this invention belongs.

Without further elaboration, it is believed that one skilled in the art can, based on the above description, utilize the present disclosure to its fullest extent. The specific embodiments are, therefore, to be construed as merely illustrative, and not limitative of the remainder of the disclosure in any way whatsoever.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects. All of the features disclosed in this specification may be combined in any combination. Each feature disclosed in this specification may be replaced by an alternative feature serving the same, equivalent, or similar purpose.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A device for detecting charged particles, comprising:
a substrate;
a charge detection plate disposed on a first side of said substrate;
an integrated circuit unit electrically connected to said charge detection plate, and disposed on a second side of said substrate that is non-coplanar with said first side; and
an interference shielding unit substantially enclosing said charge detection plate and said integrated circuit unit in such a manner as to permit impingement on said charge detection plate by the charged particles from outside of said interference shielding unit;
wherein said integrated circuit unit disposed on said second side is non-coplanar with said charge detection plate disposed on said first side so as to prevent interference on said integrated circuit unit by the charged particles, wherein said interference shielding unit includes a Faraday cage and a mesh that is connected to said Faraday cage, and wherein said Faraday cage substantially covers said first and second sides of said substrate and has two openings that respectively correspond in position to said charge detection plate and said integrated circuit unit to respectively expose said charge detection plate and said integrated circuit unit.

2. The device of claim 1, wherein said mesh covers one of said openings of said Faraday cage that corresponds in position to said charge detection plate and permits impingement on said charge detection plate by the charged particles from outside of said interference shielding unit.

3. The device of claim 1, wherein said interference shielding unit further includes a conductive sheet that is connected to said Faraday cage, and that covers one of said openings of said Faraday cage that corresponds in position to said integrated circuit unit.

4. The device of claim 1, further comprising a conductive outer housing that substantially encloses said substrate, said charge detection plate, and said Faraday cage in such a manner as to permit impingement on said charge detection plate by the charged particles from outside of said interference shielding unit and to permit signal output by said integrated circuit unit;

wherein a portion of said conductive outer housing that corresponds in position to said integrated circuit unit is connected to said Faraday cage and serves as part of said interference shielding unit.

5. The device of claim 4, wherein said conductive outer housing has a hole that corresponds in position to said charge detection plate, and said mesh is mounted to said conductive outer housing to cover said hole.

6. The device of claim 1, further comprising an insulating layer that covers a majority of said Faraday cage, and said mesh is disposed in contact with a portion of said Faraday cage uncovered by said insulating layer.

7. The device of claim 1, wherein said substrate has an indented portion and said charge detection plate is disposed in said indented portion.

8. The device of claim 7, wherein said substrate has a triple-layer structure with first, second and third layers stacked in the given sequence, said first layer having a portion that uncovers a surface of a portion of said second layer, said charge detection plate being disposed on said surface of said portion of said second layer, said integrated circuit unit being disposed on a surface of said third layer opposite to said second layer.

9. The device of claim 1, wherein said first and second sides of said substrate are opposite to each other, and wherein said integrated circuit unit disposed on said second side is opposite to said charge detection plate disposed on said first side so as to prevent interference on said integrated circuit unit by the charged particles.

10. The device of claim 1, wherein said interference shielding unit and said integrated circuit unit have isolated grounding paths.

11. The device of claim 1, wherein said integrated circuit unit includes a current to voltage converter and a voltage amplifier.

12. The device of claim 1, wherein said charge detection plate is approximately in the range of 5 to 20 mm in radius.

13. The device of claim 1, wherein said charge detection plate is capable of conducting image current of incident charged particles within the range of about 10 to 50 mm from said charge detection plate.

14. An apparatus for mass spectrometry, comprising: a mass analyzer for receiving ions from an ion source, and outputting selected ions; and
a device according to claim 1 for receiving the selected ions as the charged particles.

15. The apparatus of claim 14, said the mass analyzer is one of a quadrupole ion trap and a linear ion trap.

16. The apparatus of claim 14, wherein said charge detection plate of said device operates without charge amplification.

17. The apparatus of claim 14, wherein said charge detection plate of said device is capable of conducting image current of incident charged particles from said mass analyzer within the range of about 10 to 50 mm away from said charge detection plate.

18. A device for detecting charged particles, comprising:
a substrate;
a charge detection plate disposed on a first side of said substrate;
an integrated circuit unit electrically connected to said charge detection plate, and disposed on a second side of said substrate that is non-coplanar with said first side;
an interference shielding unit substantially enclosing said charge detection plate and said integrated circuit unit in such a manner as to permit impingement on said charge detection plate by the charged particles from outside of said interference shielding unit, wherein said interference shielding unit includes a Faraday cage and a mesh that is connected to said Faraday cage; and
an insulating layer that covers a majority of said Faraday cage, and said mesh is disposed in contact with a portion of said Faraday cage uncovered by said insulating layer,
wherein said integrated circuit unit disposed on said second side is non-coplanar with said charge detection plate disposed on said first side so as to prevent interference on said integrated circuit unit by the charged particles.

* * * * *